(12) United States Patent
Tabelander et al.

(10) Patent No.: US 8,354,838 B2
(45) Date of Patent: Jan. 15, 2013

(54) ARRANGEMENT FOR CONTACTLESSLY MEASURING A POSITION USING A MAGNETORESISTIVE SENSOR, AND METHOD FOR OPERATING THE ARRANGEMENT

(75) Inventors: Stefan Tabelander, Herford (DE); Heiko Kresse, Obernkirchen (DE)

(73) Assignee: ABB Technology AG, Zurich (CH)

( * ) Notice: Subject to any disclaimer, the term of this patent is extended or adjusted under 35 U.S.C. 154(b) by 484 days.

(21) Appl. No.: 12/728,930

(22) Filed: Mar. 22, 2010

(65) Prior Publication Data
US 2010/0237856 A1 Sep. 23, 2010

(30) Foreign Application Priority Data
Mar. 23, 2009 (DE) .................. 10 2009 014 511

(51) Int. Cl.
*G01B 7/14* (2006.01)
(52) U.S. Cl. .................................................. 324/207.21
(58) Field of Classification Search .......................... None
See application file for complete search history.

(56) References Cited

U.S. PATENT DOCUMENTS

| | | | | |
|---|---|---|---|---|
| 8,220,333 B2 * | 7/2012 | Stelter et al. .................. 73/599 |
| 2009/0302843 A1 * | 12/2009 | Fermon et al. ................ 324/309 |
| 2010/0161279 A1 * | 6/2010 | Kleegrewe et al. ........... 702/183 |
| 2010/0181513 A1 * | 7/2010 | Kresse ..................... 251/129.04 |
| 2011/0025353 A1 * | 2/2011 | Tabelander et al. ........... 324/714 |
| 2011/0035173 A1 * | 2/2011 | Tabelander et al. ............. 702/94 |
| 2011/0121817 A1 * | 5/2011 | Tabelander et al. ........... 324/115 |

* cited by examiner

*Primary Examiner* — Jermele M Hollington
(74) *Attorney, Agent, or Firm* — Buchanan Ingersoll & Rooney PC

(57) ABSTRACT

The disclosure relates to an arrangement for contactlessly measuring a position using a magnetoresistive sensor, the displacement-proportional transfer characteristic of which has a plurality of ranges which are suitable for a position measurement and associated characteristic curve sections of which have both positive and negative gradients. The arrangement can be included in a position regulator which has control electronics which, with the aid of a microcontroller, receive one or more input signals and output actuating signals for controlling the actuating drive. A method is also disclosed for operating the arrangement. For example, to uniquely associate the direction of movement of the displacement pick-off shaft with the effective direction of the drive, at least one range sensor for detecting the characteristic curve range of the magnetoresistive measuring system, which is in the form of a magnetoresistor potentiometer, in which the position is measured, is proposed. The range sensor can be connected to the control electronics. The activity of each range sensor can be assigned a sign for the gradient of the characteristic curve section of the measuring system in which the position is measured, which sign can be used to infer the effective direction of the actuating drive.

17 Claims, 2 Drawing Sheets

20  21  22  23

ARRANGEMENT FOR CONTACTLESSLY MEASURING A POSITION USING A MAGNETORESISTIVE SENSOR, AND METHOD FOR OPERATING THE ARRANGEMENT

RELATED APPLICATIONS

This application claims priority under 35 U.S.C. §119 to German Patent Application No. 10 2009 014 511.7 filed in Germany on Mar. 23, 2009, the entire content of which is hereby incorporated by reference in its entirety.

FIELD

The disclosure relates to an arrangement for contactlessly measuring a position using a magnetoresistive sensor and to a method for operating the arrangement.

BACKGROUND INFORMATION

The data sheet 10/18-0.22-DE from ABB discloses an electropneumatic position regulator which, in order to determine the position of an actuator, has a displacement sensor which is in the form of a rotary pick-up and scans an angle of rotation of up to 270°. A so-called fitting kit is used to fit the position regulator in such a manner that the position is determined directly in the case of rotatory actuators and is determined indirectly via a lifting movement which is converted into a rotational movement in the case of linear actuators or lifting drives.

The term "position regulator" used in this disclosure refers to a mechatronic system which controls the auxiliary energy of a pneumatic actuating drive according to one or more input signals in order to move the actuating member into a particular position. For operation, the digital pneumatic position regulator uses pressurized gas as auxiliary energy and electrical energy.

Known digital pneumatic position regulators include at least the core components described in more detail below. The chambers of a single-acting or double-acting pneumatic drive can be ventilated or vented in a targeted manner on the basis of one or more input signals using a pneumatic system. The movements and positions of the actuating member can be represented as one or more signals with the aid of a position feedback sensor system. Control electronics which have a microcontroller and receive one or more input signals can also be provided. The firmware in the control electronics processes the input signals and the signals from the position feedback sensor system to form output signals which can be used as input signals for the pneumatic system.

The firmware of the digital position regulator implements a function which analyzes the dynamic properties of the connected actuating drive. During start-up, the actuating range of the actuating member can be moved through once during an initialization process, and the initial value and final value of the actuating range are recorded.

Actuating drives can be subdivided into pivoting drives and lifting drives. In the case of a lifting drive, the linear movement of the output drive of the actuating drive is directly transmitted to a linearly operated actuating member. In contrast, in the case of a pivoting drive, the linear movement of the output drive of the actuating drive is converted into a rotational movement using suitable means.

In order to measure the position, it is known practice to use a potentiometer with a slider tap as the sensor. However, these potentiometers are not sufficiently robust with respect to vibration/shaking and the sliders wear out after a finite number of movements. Chemical influences may also affect the service life of slider potentiometers. This can result in failure of the displacement measurement and thus in failure of the device function. In addition, such potentiometers with a slider tap have a measurement range limited to, for example, approximately 270° and have hysteresis which cannot be ignored.

To increase the robustness of the sensor, so-called magnetoresistive sensors (called MR sensors for short below) are appropriate. A suitable variant of such an MR sensor is the magnetoresistor. A magnetoresistor changes the resistance when subjected to magnetic influence. A known, ready-made subassembly is designed like a potentiometer. It includes, in the interior, a connected magnetoresistor arrangement above which a permanent magnet is vertically arranged in a contactless manner with respect to the magnetoresistor.

The magnetoresistor is electrically contact-connected and the electrical connection is routed to the outside for use in an evaluation circuit. A shaft associated with the magnetoresistor potentiometer is rotatably mounted in such a manner that a rotatory movement can be recorded. The shaft is guided into the interior of the magnetoresistor potentiometer via a bearing. The permanent magnet is permanently mechanically connected to the shaft there. The shaft makes it possible to contactlessly rotate the permanent magnet via the magnetoresistor arrangement according to the rotational movement recorded from the outside and thus makes it possible to change the electrical resistance of the magnetoresistor arrangement.

However, above the angle of rotation of 360°, the transfer function of such a magnetoresistor arrangement has a characteristic which resembles a sine function. This is not suitable for measuring a position in the entire range of the characteristic curve. The vertices have a gradient which is too low for a position measurement or do not have a gradient at all, which could be metrologically recorded and evaluated using, for example, an A/D converter. Therefore, two ranges which are each per se approximately 120° . . . 140° are available to this sensor. The measurement ranges differ in terms of their gradient. A rising gradient of 0° . . . 180°, a falling gradient of 180° . . . 360°, in contrast to a conventional slider potentiometer which has a change in resistance (when rotated) which rises in a strictly monotonic manner and an undefined range in which the slider leaves the resistance track. After passing through the undefined range, the slider of the slider potentiometer taps the resistance track again at its origin.

In the case of known position regulators, this property of the slider potentiometer is used to determine methods of operation. Since the zero point position on the position sensor is achieved in known lifting drives by rotating to the left, the operating range is described using two position points, the point with the lower resistance being defined as 0% and the point with the higher resistance being defined as 100% of the operating range. It can thus be firmly assumed that the drive approaches its 0% position when rotated to the left and approaches the 100% position when rotated to the right. This is only possible because the position sensor has a characteristic which rises in a strictly monotonic manner, and a resistance value uniquely identifies a position.

Such a fixed association between the direction of movement and the effective direction of the drive is only possible in a magnetoresistor potentiometer when it can be ensured that either the range 0° . . . 180° or the range 180° . . . 360° is used as the sensor range. However, this restriction cannot be ensured for reasons of the application.

For example, in applications in which the usable sensor range of approximately +/−70° (140°) does not suffice, the measurement range is mechanically spread using a transmission ratio, for example a ratio of 2:1. Because the displacement pick-off shaft does not have any mechanical limitation and is rotated twice—that is to say through 720°—so that the sensor undergoes one revolution (360°), the effect occurs where the measurement range final value—for example the 0° point—is sometimes in the first measurement range of the sensor (0° ... 180°) and sometimes in the second measurement range (180° ... 360°). The gradient at the same measuring point is therefore sometimes rising and sometimes falling, which precludes an association between the direction of movement and the effective direction of the drive.

SUMMARY

An arrangement for contactlessly measuring a position of an actuator at a displacement pick-off is disclosed, the arrangement comprising a magnetoresistive measuring system, the displacement-proportional transfer characteristic of which has a plurality of ranges which are suitable for a position measurement and associated characteristic curve sections of which have positive and negative gradients; a position regulator which has control electronics and a microcontroller for receiving at least one input signal and output actuating signal for controlling an actuating drive; and at least one range sensor formed as a magnetoresistor potentiometer connected to the control electronics for detecting a characteristic curve range of the magnetoresistive measuring system by which a position of an actuator is measured.

A method is disclosed for operating an arrangement having a magnetoresistive measuring system, the displacement-proportional transfer characteristic of which has a plurality of ranges which are suitable for a position measurement and associated characteristic curve sections of which have both positive and negative gradients, a position regulator which has control electronics and a microcontroller for receiving at least one input signal and output actuating signal for controlling an actuating drive, and at least one range sensor formed as a magnetoresistor potentiometer connected to the control electronics for detecting a characteristic curve range of the magnetoresistive measuring system by which a position of an actuator is measured, the method comprising assigning activity of each range sensor a sign for a gradient of a characteristic curve section of the measuring system in which position is measured, and inferring from the sign an effective direction of an actuating drive.

BRIEF DESCRIPTION OF THE DRAWINGS

The disclosure is described in more detail below using an exemplary embodiment. In the drawings.

DETAILED DESCRIPTION

Figure 1:
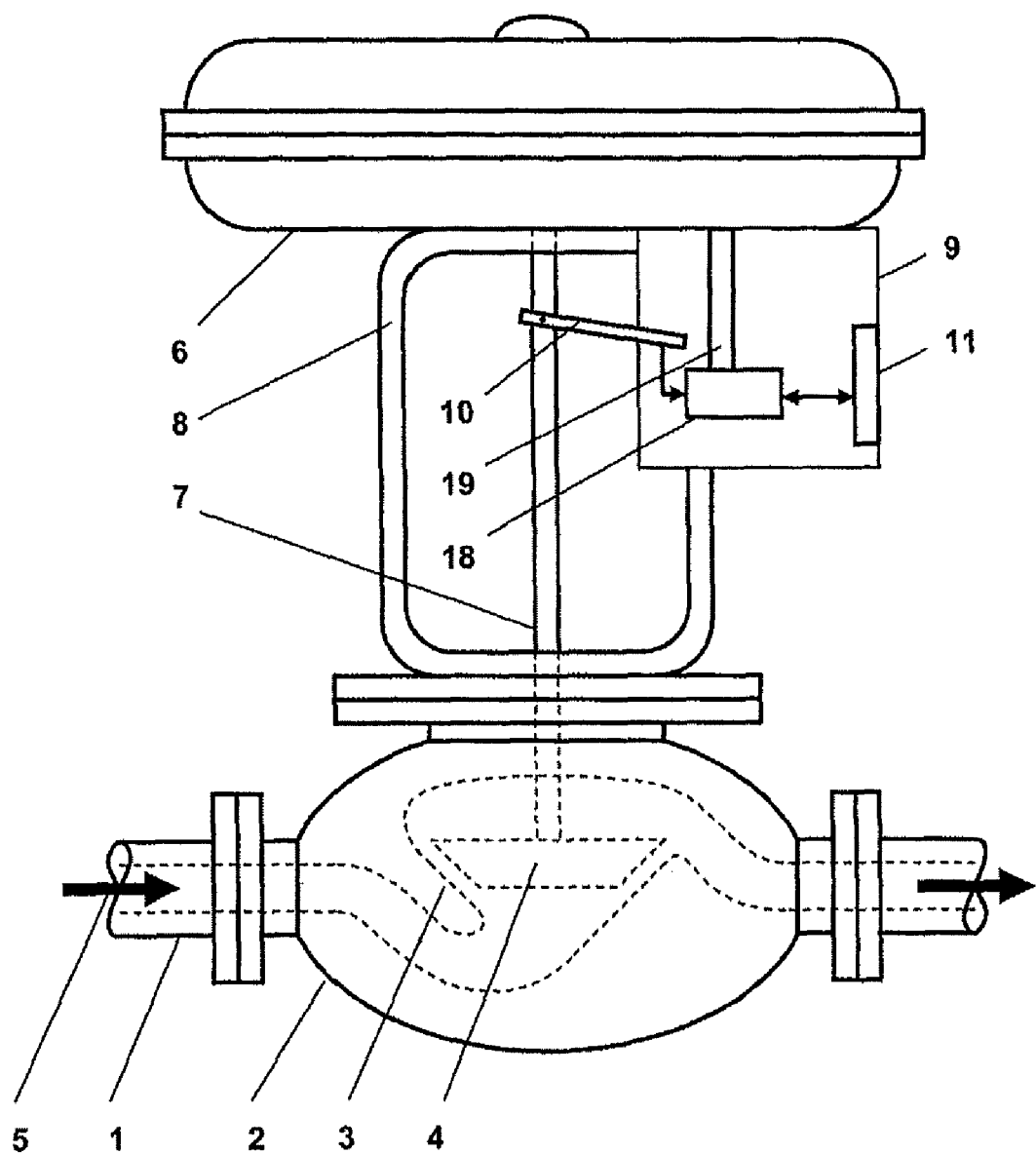
FIG. 1 shows a basic illustration of an exemplary actuating drive with a position regulator.

An arrangement for contactlessly measuring a position using an MR sensor is disclosed, along with a method for operating the arrangement, which method allows the direction of movement of the displacement pick-off shaft to be uniquely associated with the effective direction of the drive.

In an exemplary embodiment, a known actuating drive can be connected to a position regulator by means of a fitting kit, the position regulator having control electronics which, with the aid of a microcontroller, receive one or more input signals and output actuating signals for controlling the actuating drive. The position feedback sensor system is provided with a rotary magnetoresistive measuring system which is connected to a position pick-up of the actuating drive in a form-fitting manner. This measuring system has a displacement-proportional transfer characteristic having a plurality of ranges which are suitable for a position measurement and associated characteristic curve sections, which have both positive and negative gradients.

At least one range sensor for detecting the characteristic curve range of the magnetoresistive measuring system, which is in the form of a magnetoresistor potentiometer, in which the position is measured, can be provided and can be connected to the control electronics. In an exemplary embodiment, each range sensor is associated with precisely one characteristic curve range of the measuring system. Activation of a range sensor indicates the characteristic curve range of the measuring system in which the position is measured. Consequently, it is known whether it is a rising or falling characteristic curve section with respect to the direction of movement of the actuating drive. The direction of movement of the displacement pick-off shaft can thus be uniquely associated with the effective direction of the drive.

According to an exemplary embodiment of the disclosure, the range sensor is in the form of a contactlessly operating switch. With such a switch, malfunctions caused by contamination, abrasion and corrosion can be avoided.

According to another exemplary embodiment of the disclosure, the range sensor can be magnetically activated. For example, the range sensor can be activated by the magnet of the magnetoresistive measuring system. This can make it possible to dispense with special activation means, with the result that the outlay on materials for detecting the range remains low.

According to an exemplary embodiment of the disclosure, the contactlessly operating range sensor can be activated by a separate magnet which can be moved in synchronism with the displacement pick-off of the actuator. The range sensor can be integrated in an already existing electronic subassembly, with the result that it is possible to dispense with an additional printed circuit card, an electrical connection and/or a mechanical receptacle.

According to another exemplary embodiment of the disclosure, the range sensor and its operating element can be integrated in the magnetoresistive measuring system. This can provide a compact structural unit which combines all of the elements of the measuring system.

According to another exemplary embodiment of the disclosure, the range sensor can be arranged on a separate printed circuit board which covers the activating magnet in such a manner that the measurement ranges are reliably detected. The printed circuit card, its electrical connection and mechanical receptacle can be arranged in such a manner that any parts which are additional in comparison with a standard can be associated with this subassembly, and the additional costs incurred can therefore be priced according to one option.

According to another exemplary embodiment of the disclosure, the contactlessly operating range sensor can be mechanically activated. In this case, the movement of the mechanical transmission elements of the position feedback sensor system which is present can be used, with the result that it is possible to reliably determine the respective measurement range with little effort.

According to an exemplary embodiment of the disclosure, the contactlessly operating range sensor can be optically activated.

According to another exemplary embodiment of the disclosure, the contactlessly operating range sensor can be capacitively activated.

In an exemplary measuring system, provision can be made for the activity of each range sensor to be assigned a sign for the gradient of a characteristic curve section of the measuring system in which the position is measured, which sign can be used to infer the effective direction of the actuating drive. It is thus known whether it is a rising or falling characteristic curve section with respect to the direction of movement of the actuating drive, and the direction of movement of the displacement pick-off shaft can be uniquely associated with the effective direction of the drive.

According to another exemplary embodiment of the disclosure, each range sensor can be supplied during an initialization phase, and can be switched off after the initialization of the actuating drive has been concluded. As a result, the energy requirement of the actuating drive is not burdened by the range sensor when the actuating drive is used as intended.

According to another exemplary embodiment of the disclosure, a first measurement range can be identified by the single range sensor being activated during an initialization phase, and a second measurement range can be identified by the single range sensor not being activated during an initialization phase. In contrast, there is a fault if the single range sensor is activated in all measurement ranges or in no measurement range.

According to another exemplary embodiment of the disclosure, a diagnostic message can be generated when the measuring system fails.

According to another exemplary embodiment of the disclosure, the effective range of the range sensor can be smaller than the measurement range of the measuring system, ends before the measurement range final value(s), and can be completely overshot at least once in each case during the initialization phase while observing the switching state of the range sensor.

In FIG. 1, an exemplary process valve 2 is installed, as an actuator, in a pipeline 1, which is indicated in fragmentary form, of a process installation which is generally illustrated. In its interior, the process valve 2 has a closing body 4 which interacts with a valve seat 3 and can to control the amount of process medium 5 passing through. The closing body 4 can be linearly operated, via a lifting rod 7, by a pneumatic actuating drive 6 in the form of a lifting drive. The actuating drive 6 is connected to the process valve 2 via a yoke 8. A digital position regulator 9 is fitted to the yoke 8. The travel of the lifting rod 7 can be reported to the position regulator 9 via a position pick-up 10. The travel detected can be compared with a desired value, which can be supplied via a communication interface 11, in control electronics 18, and the actuating drive 6 is driven on the basis of the control error determined. The control electronics 18 of the position regulator 9 operate an I/P converter for converting an electrical control error into an adequate control pressure. The I/P converter of the position regulator 9 is connected to the actuating drive 6 via a pressure medium supply 19.

The position pick-up 10 is connected to the axis of rotation of a magnetoresistive sensor, such as a magnetoresistor potentiometer, in the position regulator 9 and has an eye in which a catch on the lifting rod 7 engages.

Figure 2:
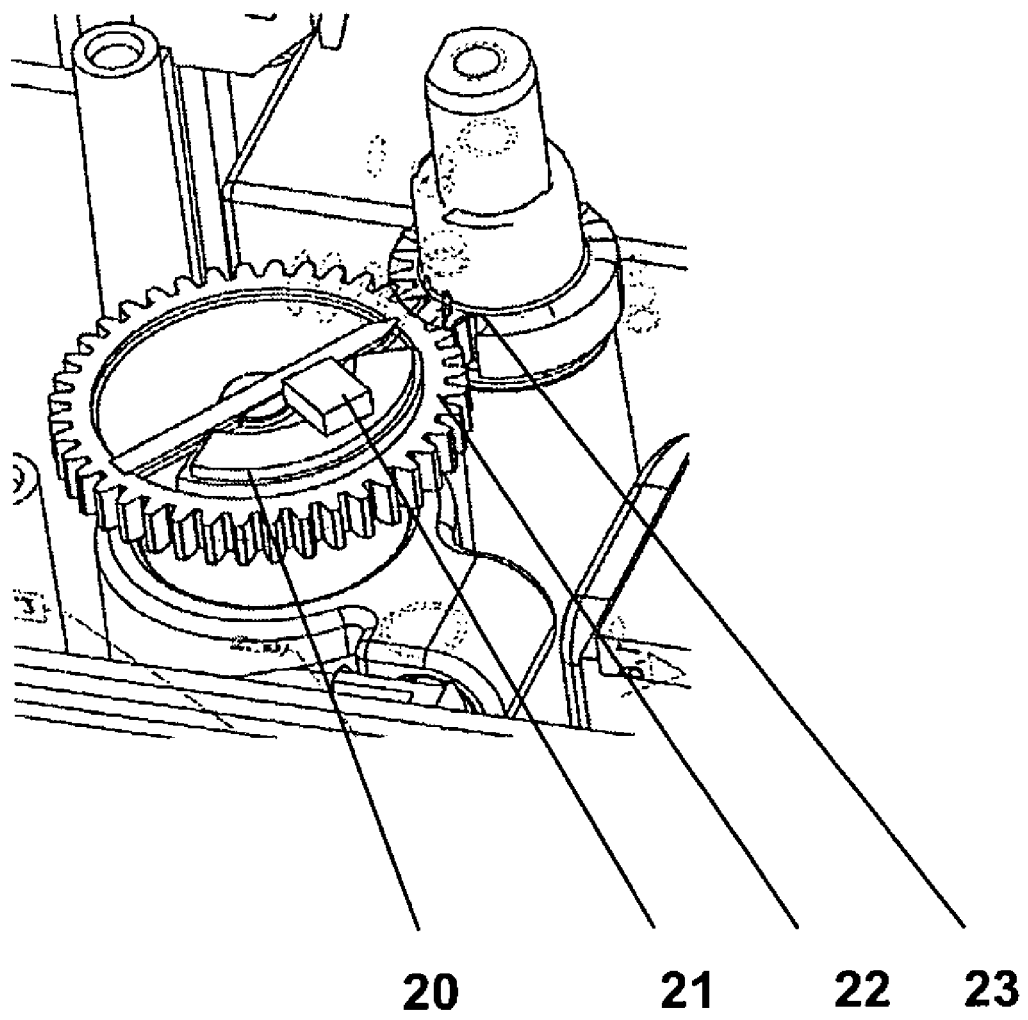
FIG. 2 shows a perspective detailed illustration of an exemplary arrangement for contactlessly measuring a position of an actuator.

In FIG. 2, an exemplary embodiment is shown to use a Hall sensor 21 as the contactlessly operating switch, which is arranged in a stationary manner on a printed circuit card. The activation element for the Hall sensor 21 can be in the form of an approximately semicircular permanent magnet 20 which is moved in synchronism with the displacement pick-off on the lifting rod 7 of the process valve 2. For example, the permanent magnet 20 can be rotatably mounted on a gear wheel 22. In this case, a qualified measurement range is respectively associated with half a revolution of the gear wheel 22. In a first measurement range, the permanent magnet 20 can be in the detection range of the Hall sensor 21. A second measurement range can be completely outside the detection range of the Hall sensor 21.

The printed circuit card can adjoin a side of the Hall sensor 21 which faces away from the permanent magnet 20, and is oriented parallel to the plane of the permanent magnet 20.

In this embodiment, the displacement pick-off of the process valve 2 can be coupled to the contactless displacement sensor which is, for example, in the form of a magnetoresistor potentiometer, with the aid of a transmission having a first gear wheel 23 and a second gear wheel 22 with a transmission ratio of 2:1. The permanent magnet 20 can be fitted to one half of the large second gear wheel 22. In an exemplary embodiment, the permanent magnet 20 scans an angle which is less than 180°. This can avoid the measurement ranges being covered by permanent magnets 20 as a result of maladjustment and tolerances and thus avoids unintentional activation of the second displacement measurement range.

In an exemplary refinement of the disclosure, the Hall sensor 21 can be supplied only within an initialization phase, for example, to provide self-adjustment, or for use in a procedure for determining the upper and lower measurement range limits. In this case, a check is carried out in order to determine whether the Hall sensor 21 has been activated at least once and whether the measured values were within the valid measurement range at any point in time. If, for example, the Hall sensor 21 has been activated, a positive gradient of the transfer characteristic of the magnetoresistor potentiometer can be assumed and, if the Hall sensor 21 has never been activated, a negative gradient can be assumed. A specific fixed effective direction of the actuating drive 6 can be inferred from the gradient of the characteristic curve which has been determined in this manner.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Process valve
3 Valve seat
4 Closing body
5 Process medium
6 Actuating drive
7 Valve rod
8 Yoke
9 Position regulator
10 Position pick-up
11 Communication interface 18 Control electronics
19 Pressure medium supply
20 Permanent magnet
21 Hall sensor
22,23 Gear wheel

What is claimed is:

1. An arrangement for contactlessly measuring a position of an actuator at a displacement pick-off, the arrangement comprising:
- a magnetoresistive measuring system, the displacement-proportional transfer characteristic of which has a plurality of ranges which are suitable for a position measurement and associated characteristic curve sections of which have positive and negative gradients;
- a position regulator which has control electronics and a microcontroller for receiving at least one input signal and output actuating signal for controlling an actuating drive; and
- at least one range sensor formed as a magnetoresistor potentiometer connected to the control electronics for detecting a characteristic curve range of the magnetoresistive measuring system by which a position of an actuator is measured.

2. The arrangement as claimed in claim 1, wherein the range sensor is a contactlessly operating switch.

3. The arrangement as claimed in claim 2, wherein the range sensor is magnetically activated.

4. The arrangement as claimed in claim 3, wherein the range sensor is activated by a magnet of the magnetoresistive measuring system.

5. The arrangement as claimed in claim 3, wherein the range sensor is activated by a separate magnet which is movable in synchronism with a displacement pick-off of the actuator.

6. The arrangement as claimed in claim 1, wherein the range sensor and an operating element thereof are integrated in the magnetoresistive measuring system.

7. The arrangement as claimed in claim 1, wherein the range sensor is a magnetic switch arranged on a separate printed circuit board which covers an activating magnet such that measurement ranges are reliably detected.

8. The arrangement as claimed in claim 1, wherein the range sensor is mechanically activated.

9. The arrangement as claimed in claim 2, wherein the range sensor is optically activated.

10. The arrangement as claimed in claim 2, wherein the range sensor is capacitively activated.

11. A method for operating an arrangement having a magnetoresistive measuring system, the displacement-proportional transfer characteristic of which has a plurality of ranges which are suitable for a position measurement and associated characteristic curve sections of which have positive and negative gradients, a position regulator which has control electronics and a microcontroller, for receiving at least one input signal and output actuating signal for controlling an actuating drive, and at least one range sensor formed as a magnetoresistor potentiometer connected to the control electronics for detecting a characteristic curve section of the magnetoresistive measuring system by which a position of an actuator is measured; the method comprising:
- assigning activity of each range sensor a sign for a gradient of a characteristic curve section of the measuring system in which position is measured; and
- inferring from the sign an effective direction of an actuating drive.

12. The method as claimed in claim 11, comprising:
- supplying each range sensor during an initialization phase; and
- switching off each range sensor after the magnetoresistor potentiometer initialization of the actuating drive has been concluded.

13. The method as claimed in claim 11, comprising:
- identifying a first measurement range by the range sensor being activated during an initialization phase; and
- identifying a second measurement range by the range sensor not being activated during an initialization phase.

14. The method as claimed in claim 11, comprising:
- providing precisely one range sensor for each characteristic curve range, wherein the measurement range is identified when precisely one range sensor is activated during the initialization phase.

15. The method as claimed in claim 14, comprising:
- identifying functionality of the measuring system when one range sensor is activated; and
- identifying failure of the measuring system when no range sensor or a plurality of range sensors is activated.

16. The method as claimed in claim 15, comprising:
- generating a diagnostic message when the measuring system fails.

17. The method as claimed in claim 11, wherein an effective range of the range sensor is smaller than the measurement range of the measuring system, ends before the measurement range final value, and is completely overshot at least once in each case during an initialization phase while observing a switching state of the range sensor.

* * * * *